US012424734B2

(12) United States Patent
Ai

(10) Patent No.: US 12,424,734 B2
(45) Date of Patent: Sep. 23, 2025

(54) BASE STATION ANTENNA AND SUPPORTING DEVICE FOR BASE STATION ANTENNA

(71) Applicant: Outdoor Wireless Networks LLC, Claremont, NC (US)

(72) Inventor: Bin Ai, Suzhou (CN)

(73) Assignee: Outdoor Wireless Networks LLC, Richardson, TX (US)

(*) Notice: Subject to any disclaimer, the term of this patent is extended or adjusted under 35 U.S.C. 154(b) by 671 days.

(21) Appl. No.: 17/844,943

(22) Filed: Jun. 21, 2022

(65) Prior Publication Data

US 2022/0416407 A1 Dec. 29, 2022

(30) Foreign Application Priority Data

Jun. 28, 2021 (CN) ........................ 202110716895.9

(51) Int. Cl.

| | |
|---|---|
| ***H01Q 1/24*** | (2006.01) |
| ***H01Q 1/42*** | (2006.01) |
| ***H01Q 19/10*** | (2006.01) |

(52) U.S. Cl.

CPC ............... *H01Q 1/246* (2013.01); *H01Q 1/42* (2013.01); *H01Q 19/10* (2013.01)

(58) Field of Classification Search

CPC .......... H01Q 1/246; H01Q 1/42; H01Q 19/10; H01Q 1/1207; H01Q 15/14; H01Q 1/12; H01Q 19/106

See application file for complete search history.

(56) References Cited

U.S. PATENT DOCUMENTS

| | | | | |
|---|---|---|---|---|
| 11,855,336 B2* | 12/2023 | Zimmerman | ............ | H01Q 1/12 |
| 2002/0140623 A1* | 10/2002 | Harrison | .................. | H01Q 9/34 343/874 |

* cited by examiner

*Primary Examiner* — Fred A Casca

(74) *Attorney, Agent, or Firm* — Myers Bigel, P.A.

(57) ABSTRACT

A supporting device for a base station antenna and a base station antenna includes: a first member configured to be mounted to the foundational component; a second member configured to be connected to an end cover at the bottom of the base station antenna; and a plurality of supporting poles that are fixedly connected to the first member and to the second member, include a first section between the first member and the second member and a second section extending from the second member in a direction away from the first member, configured to extend in the longitudinal direction of the base station antenna, are distributed in the circumferential direction of the base station antenna, and are connected to at least one reflecting plate of the base station antenna at the second section, wherein the second section extends over a part of the axial extension of the reflecting plate of the base station antenna.

20 Claims, 4 Drawing Sheets

BASE STATION ANTENNA AND SUPPORTING DEVICE FOR BASE STATION ANTENNA

RELATED APPLICATION

The present application claims priority from and the benefit of Chinese Patent Application No. 202110716895.9, filed Jun. 28, 2021, the disclosure of which is hereby incorporated herein by reference in full.

FIELD OF THE INVENTION

The present disclosure relates to the field of radio communication technology, and more specifically, to a supporting device for a base station antenna and a base station antenna including such a supporting device.

BACKGROUND OF THE INVENTION

In a radio communication system, the transmission and reception of radio frequency signals can be realized via base station antennas. Some base station antennas known in practice may have a high weight and large size, for example, they may have a weight of 35-60 kg and a length of 1.5-2.5 m. These base station antennas may need to be supported at the bottom in a cantilevered manner and installed to a foundational component such as holding pole, communication tower pole or other building. Base station antennas should be able to withstand various environmental influences, such as wind loads.

FIG. 1 shows an antenna assembly of a base station antenna known in practice, and the antenna assembly is received in a radome that is not shown in the figure. The antenna assembly has three reflecting plates P3, which are arranged in sequence in the circumferential direction of the base station antenna and form a hollow cylinder with a triangular cross. section. In order to depict the inside of the antenna assembly, one of the reflecting plates is hidden in FIG. 1. The base station antenna comprises a supporting device, which includes a central pole P1 extending over the entire length of the antenna assembly. However, on one hand the central pole P1 itself has a significant weight, which increases the weight of the entire base station antenna. For example, the central pole P1 itself may have a weight of 6-8 kg. On the other hand, the central pole P1 extends over the entire length of the antenna assembly, making assembly and wiring of the antenna assembly difficult. Furthermore, when the entire base station antenna is supported through the base P2 in a cantilevered manner, despite the presence of the central pole P1, the strength in the bottom section of the antenna assembly adjacent to the base P2 may still pose a problem.

SUMMARY OF THE INVENTION

The purpose of the present disclosure is to provide a supporting device for a base station antenna, wherein the supporting device has a compact structure, provides reliable support to the base station antenna, and will only occupy a small space inside the radome of the base station antenna.

The first aspect of the present disclosure relates to a supporting device for a base station antenna, which includes:

a first member configured to he mounted to a foundational component;

a second member configured to be connected to an end cover at the bottom of the base station antenna; and a plurality of supporting poles that are fixedly connected to the first member and to the second member; include a first section between the first member and the second member and a second section extending from the second member in a direction away from the first member; configured to extend in the longitudinal direction of the base station antenna, are distributed in the circumferential direction of the base station antenna, and are connected to at least one reflecting plate of the base station antenna in the second section, wherein the second section extends over a part of the axial extension of the reflecting plate of the base station antenna.

In some embodiments, the supporting device may be configured for use in a base station antenna having a plurality of reflecting plates sequentially arranged in the circumferential direction of the base station antenna, wherein the second section of each supporting pole may be configured to be connected with two adjacent longitudinal edges of the two reflecting plates.

In some embodiments, the second section of each supporting pole may be configured to be connected to two adjacent longitudinal edges of the two reflecting plates on the radial inner side or the radial outer side.

In some embodiments, the supporting device is configured for use in a base station antenna with m reflecting plates, and the supporting device includes n supporting poles, wherein m≥3, n≥3, and m≥n. Some examples of the number of reflecting plates and the number of supporting poles may be: m=3, n=3; m=4, n=4; m=6, n=3; m=6, n=4; m=8, n=4; m=8, n=6.

In some embodiments, the supporting pole may have a V-shaped cross-section at least in the second section, wherein one leg of the V shape is configured to connect to one of the two adjacent longitudinal edges, and the other leg of the V shape is configured to be connected to the other longitudinal edge among the two adjacent longitudinal edges.

In some embodiments, the supporting pole may have a V-shaped cross section over its entire length.

In some embodiments, the supporting pole may have a U-shaped cross-section, wherein the U shape may have an opening angle, in other words, the two legs of the U shape may respectively form an angle greater than 90° with the bottom of the U shape.

In some embodiments, the supporting device may include a third member, which may he connected to the second section of each supporting pole, such as by screwing or welding.

In some embodiments, the third member may be connected to the second section of each supporting pole on the free end of the second section of each supporting pole.

In some embodiments, the third member may be connected to the second section of each supporting pole at the middle of the second section of each supporting pole.

In some embodiments, the third member may be configured to he connected to at least one reflecting plate, in particular, to all reflecting plates of the base station antenna.

In some embodiments, the third member may be configured as a polygonal plate-shaped component.

In some embodiments, the plate-shaped component may have a polygonal bottom surface and edges bent from the bottom surface.

In some embodiments, the plate-shaped component may be connected to the second section of each supporting pole in the corner areas on the bottom surface.

In some embodiments, the plate-shaped member may be configured to be connected to each reflecting plate of the base station antenna in the corner areas on the bent edges.

In some embodiments, the third member may have at least three radial arms.

In some embodiments, the radial arm maybe connected at its free end to the second section of each supporting pole, in particular, to the free end of the second section of each supporting pole.

In some embodiments, at least one of the first member and the second member may be configured as a plate-shaped component.

In some embodiments, the first member may be configured as a disk-shaped component, or may be configured as a plate-shaped component having at least three radial arms.

In some embodiments, the second member may be configured as a ring-shaped component.

In some embodiments, the second member may be configured as a circular ring-shaped component, or may be configured as a polygonal ring-shaped component, such as a triangular ring-shaped component.

In some embodiments, the second member may be connected with the end cover on the exterior of the end cover, for example, by threaded connection using screws.

In some embodiments, the supporting pole may be screwed with the reflecting plate on the second section thereof.

In some embodiments, the connection between the first member and the second member and each supporting pole can be realized by welding.

In some embodiments, the supporting device may include a fourth member, which may be configured as an end cover for clamping the bottom of the base station antenna between itself and the second member.

In some embodiments, at least one, preferably all of the first member, the second member, the third member, the fourth member, and the supporting poles are made of metal materials (in particular, sheet metal), such as stainless steel, aluminum, or carbon steel. The components of the supporting device may be connected by welding, screwing and/or riveting.

In some embodiments, the supporting device may be configured to support the base station antenna in a cantilevered manner at the bottom of the base station antenna.

The second aspect of the present disclosure relates to a base station antenna comprising a radome, an antenna assembly received in the radome, and an end cover for closing the open bottom of the radome, with the antenna assembly including at least one reflecting plate; wherein the base station antenna includes a supporting device for the base station antenna according to the first aspect of the present disclosure, wherein the second member of the supporting device is connected to the end cover of the base station antenna, and the supporting poles of the supporting device are connected to the reflecting plate of the base station antenna at the second section, wherein the second section extends on a part of the axial extension of the reflecting plate of the base station antenna.

In some embodiments, the axial extension of the second section may not exceed ½ of the axial extension of the reflecting plate of the base station antenna, for example, it may be ¼-½ of the axial extension of the reflecting plate, such as between ⅓ and ⅖.

In some embodiments, the antenna assembly may include at least three reflecting plates. When viewed in the cross section of the base station antenna, the reflecting plates may form a polygon, and the second section of each supporting pole may be located in a corner area of the polygon formed by the surrounding reflecting plates.

The above-mentioned technical features, the technical features to be mentioned below and the technical features shown separately in the drawings can be arbitrarily combined with each other as long as the combined technical features are not contradictory. All technically feasible characteristic combinations are technical contents contained herein.

BRIEF DESCRIPTION OF THE DRAWINGS

The present disclosure will be explained in more detail by means of exemplary embodiments with reference to the schematic. drawings attached. Among them.

DETAILED DESCRIPTION OF SPECIFIC EMBODIMENTS

Figure 1:
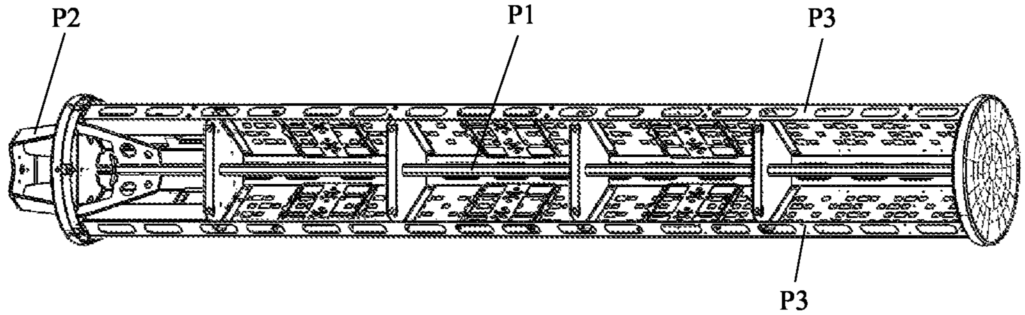
FIG. 1 is a perspective view of an antenna assembler of a known base station antenna.
Figure 2:
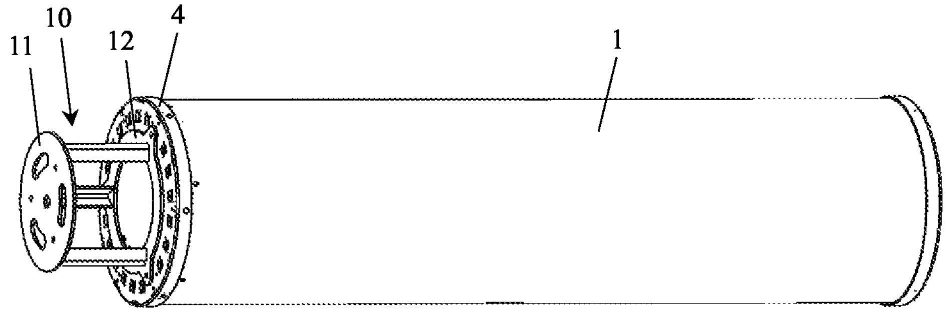
FIG. 2 is a perspective view of a base station antenna according to an embodiment of the present disclosure.
Figure 3:
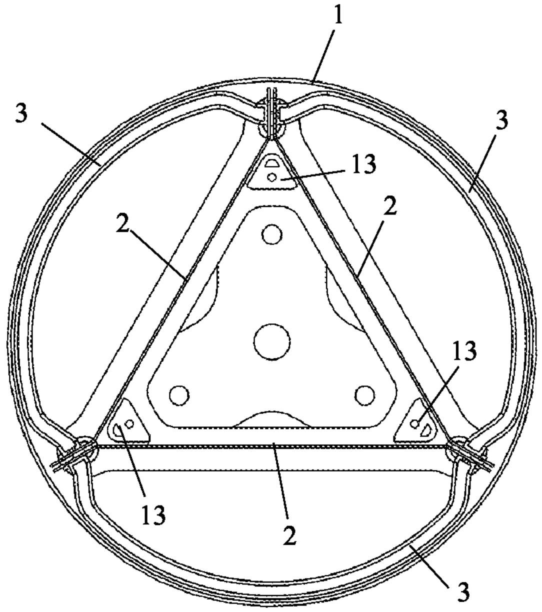
FIG. 3 is a simplified cross-sectional view of the base station antenna of FIG. 2.
Figure 4:
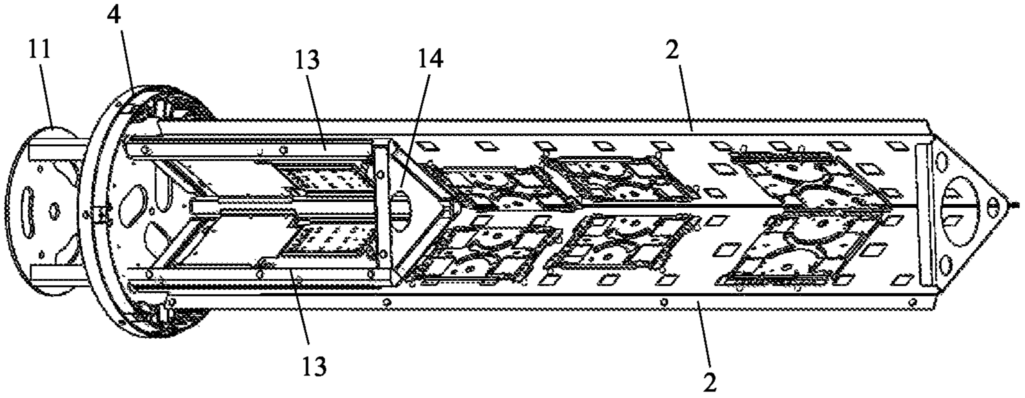
FIG. 4 is a perspective view of the antenna assembly and supporting device of the base station antenna of FIG. 2 in an assembled state.
Figure 5:
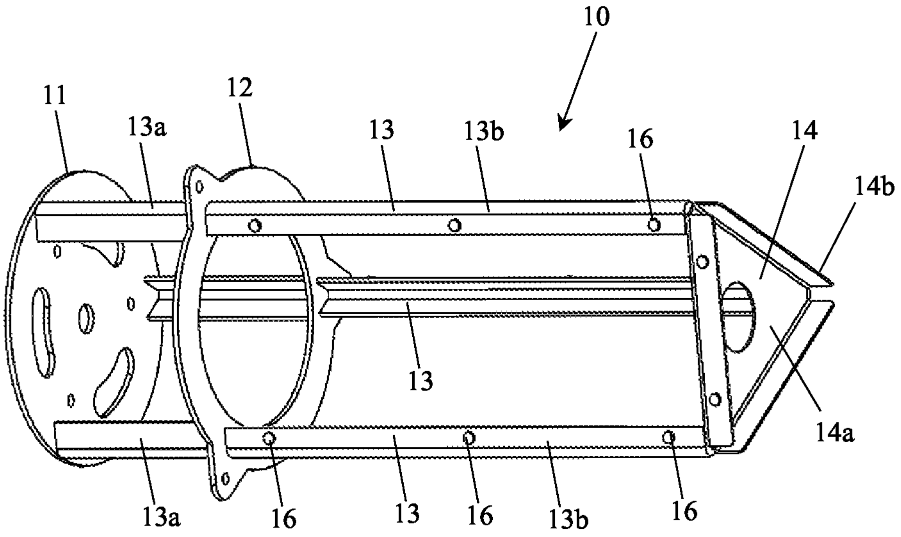
FIG. 5 is a perspective view of the supporting device of the base station antenna of FIG. 2.

A supporting device 10 for a base station antenna and a base station antenna including the supporting device 10 according to an embodiment of the present disclosure are described below, with reference to FIGS. 2 to 5. FIG. 2 is a perspective view of the base station antenna. FIG. 3 is a simplified cross-sectional view of the base station antenna. FIG. 4 is a perspective view of the antenna assembly and the supporting device 10 of the base station antenna in an assembled state, in which, in order to show the supporting device 10 inside the antenna assembly, one of the reflecting plates 2 of the antenna assembly is omitted. FIG. 5 is a perspective view of the supporting device 10 of the base station antenna.

The base station antenna includes a radome 1 and an antenna assembly received in the radome 1 and an end cover 4 for closing the open bottom of the radome 1. The antenna assembly includes three reflecting plates 2 that roughly form a triangle when viewed in the cross section of the base station antenna. As shown in FIG. 2, the base station antenna may be supported on a foundational component such as a holding pole or other building in a cantilevered manner through the first member 11 of the supporting device 10. In the axial extension of the antenna assembly, the antenna assembly may be supported radially with respect to the radome 1 by at least one set of radome supporting members 3. A set of three radome supporting members 3 is provided in FIG. 3, which are respectively connected to the reflecting plate 2 at two ends and jointly form a circumferentially closed radial supporting structure. The supporting device may be made of a suitable metal material such as galvanized steel, stainless steel or aluminum, and in particular, may be made of a metal material suitable for welding.

The supporting device 10 may include a first member 11, a second member 12 and three supporting poles 13. The first member 11 is configured to be mounted to a foundational component. The second member 12 is configured to be connected with the end cover 4 at the bottom of the base station antenna, for example, by screws. The first member 11 and the second member 12 may be respectively configured as plate-shaped components, and may be provided with one or more holes for receiving fastening elements. As shown in FIGS. 2 to 5, the first member 11 may be configured as a disk-shaped component, and the second member 12 may be configured as a circular ring-shaped component.

The supporting pole 13 may be fixedly connected to the first member 11 and to the second member 12, for example, by welding. The supporting pole 13 may include a first section 13*a* between the first member 11 and the second member 12 and a second section 13*b* extending from the second member 12 in a direction away from the first member 11. Each supporting pole 13 may extend in the longitudinal direction of the base station antenna, and may be distributed, in particular evenly distributed, in the circumferential direction of the base station antenna. The second section 13*b* of each supporting pole 13 may be connected to two adjacent longitudinal edges of the two reflecting plates 2. The supporting pole 13 may have a V-shaped cross-section at least in the second section 13*b*, especially over the entire length, wherein one leg of the V shape is configured to connect to one of the two adjacent longitudinal edges, and the other leg of the V-shape may be connected to the other longitudinal edge among the two adjacent longitudinal edges. When viewed in cross-section of the base station antenna, the second section 13*b* of each supporting pole 13 may be located inside a corner area of the triangular shape formed by the surrounding reflecting plates 2. The second section 13*b* of each supporting pole 13 extends on a part of the axial extension of the reflecting plate 2 of the base station antenna, in particular, the axial extension of the second section 13*b* is not, more than ⅔ of the axial extension of the reflecting plate 2, for example, not more than ½, and in some embodiments not less than ¼ of the axial extension of the reflecting plate 2, for example not less than ⅓. In order to connect each second section 13*b* with each reflecting plate 2, each second section 13*b* may respectively have at least one hole 16 for receiving a fastening element in its axial extension. In the example shown in FIG. 5, each second section 13*b* may have three such holes 16 on the two legs of the V-shape.

The supporting device 10 may include a third member 14, which may be connected to the second section 13*b* of each supporting pole 13, for example, by screw connection. For example, the third member 14 may be connected to the second section 13*b* of each supporting pole 13 oil the free end of the second section 11*b* of each supporting pole 13. The third member 14 may also be configured to be connected to each reflecting plate 2 of the base station antenna. The third member 14 may be configured as a triangular plate-shaped component, which may have a triangular bottom surface 14*a* and three edges 14*b* bent from the bottom surface 14*a*. The third member 14 may be connected to the second section 13*b* of each supporting pole 13 in the corner areas on the bottom surface 14*a*, and may be connected to each reflecting plate 2 of the base station antenna in the corner areas on the bent edges 14*b*.

Figure 6:
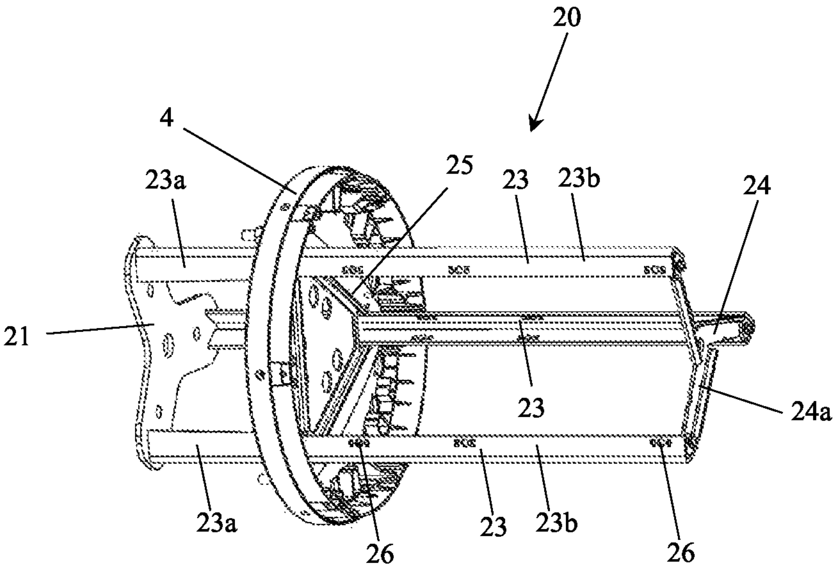
FIGS. 6 and 7 are perspective views of the supporting device and the end cover in an assembled state and in an exploded state according to another embodiment of the present disclosure.
Figure 7:
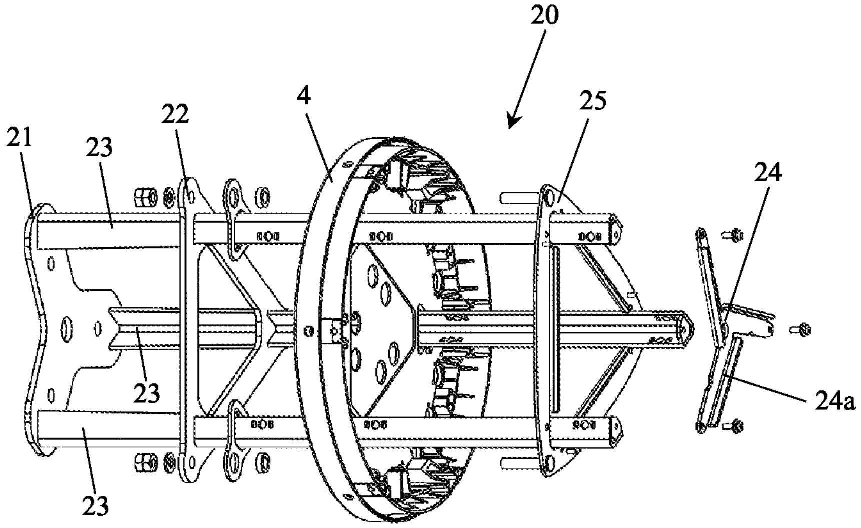

FIGS. 6 and 7 are perspective views of the supporting device 20 and the bottom end cover 4 of the base station antenna in an assembled state and in an exploded state according to another embodiment of the present disclosure. The supporting device 20 is applicable for an antenna assembly comprising three reflecting plates 2 and a base station antenna including the antenna assembly, as shown in FIGS. 2 to 5.

The supporting device 20 may include a first member 21, a second member 22 and three supporting poles 23. The first member 21 is configured to be mounted to a foundational component. The second member 22 is configured to be connected with the end cover 4 at the bottom of the base station antenna. In contrast to the embodiment shown in FIGS. 2 to 5, the first member 21 may be configured as a plate-shaped component with at least three radial arms, and the second member 12 may be configured as a triangular ring-shaped component, enabling it to be lighter compared to the aforementioned embodiment while essentially maintaining the same load-bearing capacity.

The supporting pole 23 may be fixedly connected to the first member 21 and to the second member 22, for example, by welding. The supporting pole 23 may include a first section 23*a* between the first member 21 and the second member 22 and a second section 23*b* extending from the second member 22 in a direction away from the first member 21. The second section 23*b* of each supporting pole 23 may be connected to two adjacent longitudinal edges of the two reflecting plates 2. The supporting pole 23 may have a V-shaped cross-section at least in the second section 23*b*, in particular over the entire length, wherein one leg of the V-shape is configured to connect to one of the two adjacent longitudinal edges, and the other leg of the V-shape may be connected to the other longitudinal edge among the two adjacent longitudinal edges. In order to connect each second section 23*b* with each reflecting plate 2, each second section 23*b* may respectively have at least one hole 26 for receiving a fastening element in its axial extension.

The supporting device 20 may include a third member 24 which may he connected to the second section 23*b* of each supporting pole 23, for example, by screw connection. For example, the third member 24 may be connected to the second section 23*b* of each supporting pole 23 on the free end of the second section 23*b* of each supporting pole 23. The third member 24 may also be configured to be connected to each reflecting plate 2 of the base station antenna. The third member 24 may have three radial arms 24*a*, and the radial arms 24*a* may be connected to the second section 23*b* of each supporting pole 23 at its free end, for example, by screw connection. Each radial arm 24*a* may have an L-shaped cross-section, and may be connected to the reflecting plate of the base station antenna through one leg of the shape, for example, by screw connection. Compared with the embodiment shown in FIGS. 2 to 5, the third member 24 can be lighter than the aforementioned embodiment while essentially maintaining the same load-bearing capacity.

The supporting device 20 may additionally include a fourth member 25. The fourth member 25 may be configured as an end cover 4 for clamping the bottom of the base station antenna between itself and the second member 22. During assembly, the end cover 4 may first be rested on the second member 22, and then the fourth member 25 may be sleeved from the free end of the second section 23*b* of each supporting pole 23 onto the second section 23*b*, and moved along the second section 23*b* until it abuts against the end cover 4, and finally the second member 22 and the fourth member 25 are fastened with screws to clamp the end cover 4 between the second member and the fourth member.

The two embodiments as shown in FIGS. 2 to 7 or similar supporting devices may also be referred to as skeletal-type supporting devices, potentially having optimized weight and excellent strength. In addition, as shown in FIG. 3, in the cross-section of the base station antenna, the supporting device only occupies a small structural space in the corner areas of the polygonal shape formed by the surrounding reflecting plates, Which facilitates the wiring of the base station antenna and the arrangement of the radiator or other components on the reflecting plates, FIGS. 8A to 8E are simplified cross-sectional views of various embodiments of the base station antenna, wherein only the radome, reflecting plates and supporting poles of the base station antenna are depicted in the corresponding cross-sections. These diagrams illustrate the various possibilities of the layout of multiple supporting poles and multiple reflecting plates.

Figure 8A:
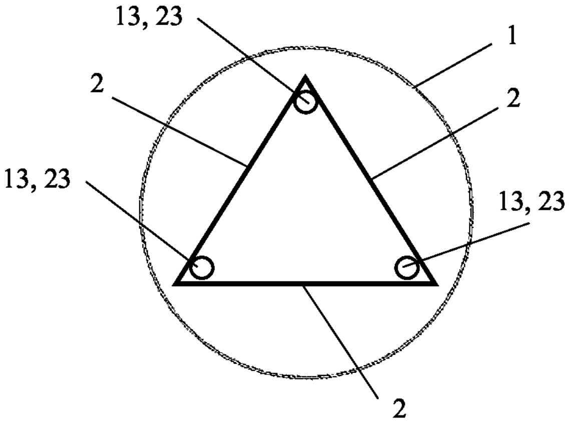
FIGS. 8A to 8E are simplified cross-sectional views of various embodiments of the base station antenna.

In FIG. 8A, the layout of three supporting poles and three reflecting plates of the two embodiments shown in FIGS. 2 to 7 is schematically depicted, wherein the three supporting plates 2 roughly form a triangle in the cross section of the base station antenna, and the three supporting poles 13, 23 schematically represented by small circles are arranged on the inner side of the corner areas of the triangular formation.

Figure 8B:
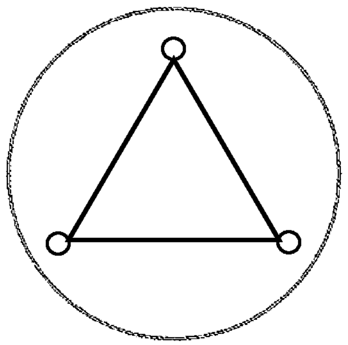

An alternative embodiment is schematically depicted in FIG. 8B, which is different from the situation of FIG. 8A in that the three supporting poles schematically represented by small circles are arranged outside the corner areas of the triangular formation.

Figure 8C:
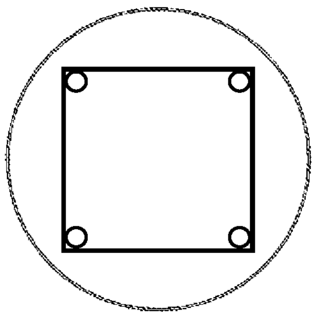

In the embodiment schematically depicted in FIG. 8C, the antenna assembly has four reflecting plates, which form a square in the cross-section of the base station antenna, and one supporting pole of the supporting device is arranged on the inner side of the four corner areas of the square formation, respectively.

Figure 8D:
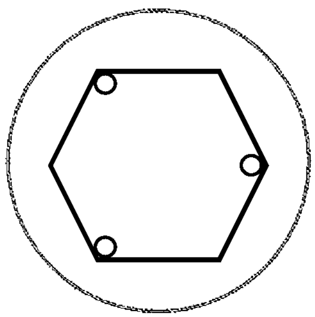

In the embodiment schematically depicted in FIG. 8D, the antenna assembly has six reflecting plates, which form a regular hexagon in the cross-section of the base station antenna, and one supporting pole of the supporting device is arranged on the inner side of three corner areas among the six corner areas of the regular hexagon formation, respectively.

Figure 8E:
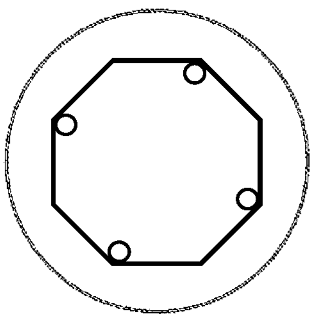

In the embodiment schematically depicted in FIG. 8E, the antenna assembly has eight reflecting plates, which form a regular octagon in the cross section of the base station antenna, and one supporting pole of the supporting device is arranged on the inner side of four corner areas among the eight corner areas of the regular octagon formation, respectively.

It will be understood that, the terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprise" and "include" (and variants thereof), when used in this specification, specify the presence of stated operations, elements, and/or components, but do not preclude the presence or addition of one or more other operations, elements, components, and/or groups thereof. As used herein, the term "and/or" includes any and all combinations of one or more of the associated listed items. Like reference numbers signify like elements throughout the description of the figures.

The thicknesses of elements in the drawings may be exaggerated for the sake of clarity. Further, it will be understood that when an element is referred to as being "on," "coupled to" or "connected to" another element, the element may be formed directly on, coupled to or connected to the other element, or there may be one or more intervening elements therebetween. In contrast, terms such as "directly on," "directly coupled to" and "directly connected to," when used herein, indicate that no intervening elements are present. Other words used to describe the relationship between elements should be interpreted in a like fashion (i.e., "between" versus "directly between", "attached" versus "directly attached," "adjacent" versus "directly adjacent", etc).

Terms such as "top," "bottom," "upper," "lower," "above," "below," and the like are used herein to describe the relationship of one element, layer or region to another element, layer or region as illustrated in the figures. It will be understood that these terms are intended to encompass different orientations of the device in addition to the orientation depicted in the figures.

It will be understood that, although the terms "first," "second," etc. may be used herein to describe various elements, these elements should not be limited by these terms. These terms are only used to distinguish one element from another. Thus, a first element could be termed a second element. without departing from the teachings of the inventive concept.

It will also be appreciated that all example embodiments disclosed herein can be combined in any way.

Finally, it is to be noted that, the above-described embodiments are merely for understanding the present invention but not constitute a limit on the protection scope, of the present invention. For those skilled in the art, modifications may be made on the basis of the above-described embodiments, and these modifications do not depart from the protection scope of the present invention.

The invention claimed is:

1. A supporting device for a base station antenna, comprising:

a first member configured to be mounted to a foundational component;

a second member configured to be connected to an end cover (4) at the bottom of the base station antenna;

a plurality of supporting poles that are fixedly connected to the first member and to the second member; include a first section between the first member and the second member and a second section extending from the second member in a direction away from the first member;

configured to extend in the longitudinal direction of the base station antenna, are arranged in the circumferential direction of the base station antenna, and are connected to at least one reflecting plate of the base station antenna in the second section, wherein the second section extends over a part of the axial extension of the reflecting plate of the base station antenna.

2. The supporting device for a base station antenna according to claim 1, wherein the supporting device is configured for use in a base station antenna having a plurality of reflecting plates sequentially arranged in a circumferential direction of the base station antenna, wherein the second section of each supporting pole is configured to be connected with two adjacent longitudinal edges of the two reflecting plates.

3. The supporting device for a base station antenna according to claim 2, wherein the supporting device is configured for use in a base station antenna having m reflecting plates, and the supporting device includes n supporting poles, wherein m≥3. n≥3, and m ≥n.

4. The supporting device for a base station antenna according to claim 2, wherein the supporting pole has a V-shaped cross-section at least in the second section, wherein one leg of the V-shape is configured to connect to one of the two adjacent longitudinal edges, and the other leg of the V-shape is configured to be connected to the other longitudinal edge among the two adjacent longitudinal edges.

5. The supporting device for a base station antenna according to claim 1, wherein the supporting device comprises a third member, which is connected to the second section of each supporting pole.

6. The supporting device for a base station antenna according to claim 5, wherein the third member is connected to the second section of each supporting pole at the free end of the second section of each supporting pole.

7. The supporting device for a base station antenna according to claim 5, wherein the third member is configured to be connected to each reflecting plate of the base station antenna.

8. The supporting device for a base station antenna according to claim 5, wherein the third member is configured as a polygonal plate-shaped component which has a polygonal bottom surface and edges bent from the bottom surface, is connected to the second section of each supporting pole in the corner areas on the bottom surface, and is connected to the reflecting plates of the base station antenna in the corner areas on the bent edges.

9. The supporting device for a base station antenna according to claim 5, wherein the third member has at least three radial arms, which are connected to the second section of each supporting pole on their respective free ends.

10. The supporting device for a base station antenna according to claim 1, wherein at least one of the first member and the second member is configured as a plate-shaped component.

11. The supporting device for a base station antenna according to claim 10, wherein the first member is configured as a disk-shaped component, or is configured as a plate-shaped component with at least three radial arms.

12. The supporting device for a base station antenna according to claim 10, wherein the second member is configured as a ring-shaped component.

13. The supporting device for a base station antenna according to claim 12, wherein the second member is configured as a circular ring-shaped component or as a polygonal ring-shaped component.

14. The supporting device for a base station antenna according to claim 1, wherein the connection between the first member and the second member and each supporting pole is realized by welding.

15. The supporting device for a base station antenna according to claim 1, wherein the supporting device comprises a fourth member, which is configured as an end cover for clamping the bottom of the base station antenna between itself and the second member.

16. A base station antenna, comprising:

a radome, an antenna assembly received in the radome, and an end cover for closing the open bottom of the radome, with the antenna assembly including at least one reflecting plate;

wherein the base station antenna includes a supporting device for the base station antenna according to claim 1, wherein the second member of the supporting device is connected to the end cover of the base station antenna, and supporting poles of the supporting device are connected to the reflecting plate of the base station antenna at the second section, wherein the second section extends on a part of the axial extension of the reflecting plate of the base station antenna.

17. The base station antenna according to claim 16, wherein the axial extension of the second section is not more than ½ of the axial extension of the reflecting plate of the base station antenna.

18. The base station antenna according to claim 16, wherein the axial extension of the second section is not less than ⅓ of the axial extension of the reflecting plate of the base station antenna.

19. The base station antenna according to claim 16, wherein the antenna assembly includes at least three reflecting plates, and when viewed in a cross section of the base station antenna, the reflecting plates form a polygon and the second section of each supporting pole is located in a corner area of the polygon formed by the surrounding reflecting plates.

20. The base station antenna according to claim 16, wherein the base station antenna is supported by the supporting device in a cantilevered manner.

* * * * *